May 15, 1923.
R. A. WILLSON
APPARATUS FOR REFRIGERATION
Filed Oct. 11, 1921
1,455,156
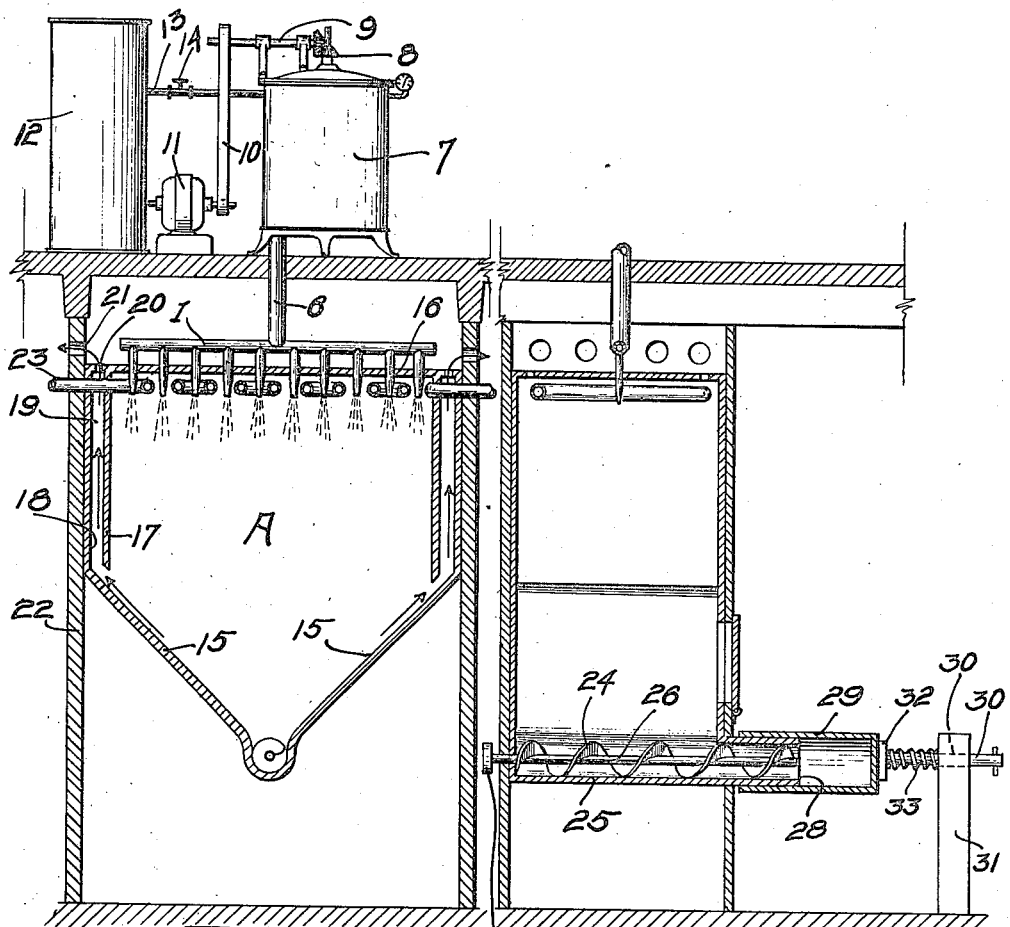
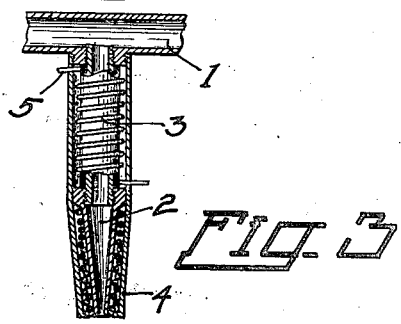
Inventor
Russell A. Willson
By Herbert E. Smith
Attorney Patented May 15, 1923.

1,455,156

UNITED STATES PATENT OFFICE.

RUSSELL A. WILLSON, OF SPOKANE, WASHINGTON, ASSIGNOR OF ONE-HALF TO FRED N. MARTIN, OF SPOKANE, WASHINGTON.

APPARATUS FOR REFRIGERATION.

Application filed October 11, 1921. Serial No. 507,004.

*To all whom it may concern:*

Be it known that I, RUSSELL A. WILLSON, a citizen of the United States, residing at Spokane, in Spokane County and State of Washington, have invented certain new and useful Improvements in Apparatus for Refrigeration, of which the following is a specification.

The present invention relates to an improved apparatus for refrigeration involving means for accomplishing the atomization of a liquid and subsequent congelation or refrigeration of the atomized liquid, in the manufacture of frozen confections, such as ice cream, ices, frozen custards and similar products.

For convenience of illustration and description of the apparatus and process employed in carrying out my invention, I shall hereinafter refer to the making of ice cream as a concrete example, but it will be readily understood that the principles of the process, and the apparatus may be employed and utilized in the production of other congealed or refrigerated articles.

In the accompanying drawings I have illustrated one complete example of the physical embodiment of the apparatus utilized in carrying out the process of my invention, in which the parts are combined and arranged according to the best mode I have so far devised for the practical application of the principles of my invention, and which embodiment has proven highly satisfactory and successful in actual use.

The invention essentially consists in means employed for subjecting a liquid to treatment by first converting the liquid into atoms, then congealing the atoms while in suspension, and then precipitating the congealed product. The gathered product, after congelation, is then packed and stored, and the invention further consists in certain novel combinations and arrangements of parts in the apparatus for gathering and packing the congealed material and in novel constructions for enhancing the efficiency of the apparatus employed to carry out the process.

Figure 1 is a view showing a freezing chamber in section, together with the pneumatic apparatus for atomizing the liquid, which is afterward solidified, gathered and conveyed to its destination for packing.

Figure 2 is a sectional view taken at right angles to the view of Fig. 1.

Figure 3 is an enlarged, detail sectional view showing one of the non-freezing nozzles for atomizing the liquid.

In the preferred form of the invention disclosed in the drawings the invention contemplates the process and apparatus for solidification of a liquid especially prepared for the making of ice cream, and the liquid employed may have previously been flavored, as desired, or the congealed flakes as they are embodied in the mass or mixture may be mixed with flavoring flakes, similarly prepared.

In carrying out my process of refrigeration I utilize a refrigerating chamber or room A in which the temperature has been reduced, and is maintained, at a temperature below 32° F., or sufficiently below the freezing point to congeal the atomized liquid projected therein, similar to the snow flakes or frozen particles of vapor in the atmosphere in the form of feathery flakes.

The temperature of the chamber A is maintained below the freezing point, and into the cold air of the chamber the liquid is projected in the form of atoms through a series of tubes or pipes 1, located near the ceiling of the chamber and extending horizontally across the chamber.

One or more of the pipes 1 may be employed, and these pipes are provided with vertically arranged, downwardly projecting nozzles 2, the pipe 1 forming a head and the nozzles 2 being spaced at regular intervals throughout the length of the head, as seen in Figure 1. To prevent the liquid freezing within the nozzles and thus obstructing the passage therethrough of the atomized liquid, I preferably encase each of the nozzles with a heater, or heating device. In Fig. 3 this device is illustrated as an electric heater and comprises heating coils 3 wound around the nozzle and encased within the suitably insulated casing 4, the wire ends 5 being connected to an electric supply. The heat applied may be regulated in such manner as to maintain the liquid at the proper temperature, within the nozzle, to insure freedom of flow therethrough, and thus prevent congelation within the nozzle.

A supply pipe 6 is connected to the head 1 and passes upwardly to the vessel 7 which is designed as a mixer for the liquid to be congealed. The mixer may be supplied with the necessary liquid and the desired liquid or other form of flavor, and the mixing operation may be accomplished by suitable mixing apparatus within the vessel operated from the gear set 8, shaft 9 and belt 10 from the motor 11.

The required pressure of air is maintained in the mixer for forcing the liquid, either flavored or unflavored, to the nozzles, from the compressed air tank 12 which is connected to the mixer by pipe 13, and the pressure may be regulated or controlled by the valve 14 in said pipe.

Thus the air pressure in the mixer assists in forcing the liquid from the mixer or reservoir 7 down through pipe 6 to the distributing head 1 and the liquid is atomized through the nozzles 2 into the chamber A where the atoms are congealed or frozen into flakes. The intensity of the air pressure from the tank 12 is controlled and regulated, and the atomization is uniformly distributed through the refrigerating chamber so that the interior of the chamber may be filled with feathery flakes of the atomized liquid, floating in suspension, and gradually falling to the inclined sides or bottom 15, 15 of the chamber.

For venting the freezing chamber, which is closed at the upper portion by the top wall 16, I employ spaced interior side walls 17 extending from the ceiling or top of the chamber and terminating at the upper edges of the inclined bottom walls 15. Between these interior side walls and the exterior side walls 18 are formed lateral, vertically extending passages or flues 19. At the upper ends of the flues are openings 20 in the ceiling 16, and additional openings 21 are provided in the walls 22 of the inclosure for the chamber, for exit of warm air, or rather for the exit of air from which the heat has not sufficiently been extracted.

The refrigerating coils 23 are supplied with any desired heat extracting medium passing therethrough, and as these coils are located in the upper part of the refrigerating chamber, the weight of the cold air forces the air which may be at a higher temperature, downwardly. The comparatively warmer air is thus caused to pass in the direction of the arrows in the chamber, and up through the flues 19, openings 20 and 21 and to the atmosphere, and insuring a circulation of the air together with elimination of comparatively warm air from the freezing chamber A.

When ice cream is being made, it will readily be apparent that the liquid ingredient from which the ice cream is to be prepared may also contain the liquid flavor, as for instance in the preparation of peach ice cream, the peach syrup may be incorporated in the liquid preparation within the mixer 7 by means of proper agitators or mixers. Then this flavored liquid is projected by air pressure, as well as gravity, through the spraying or atomizing nozzles into the air within the freezing chamber, and the capacity of production will vary with the number of nozzles and heads used.

Instead of incorporating the liquid flavor, as peach syrup, with the liquid cream to be solidified before atomization, it will be obvious that the liquid flavor may be introduced separately into the refrigerating chamber A, as for instance through some of the nozzles 2. Thus the flavoring syrup is atomized and congealed into feathery flakes, similar to the cream flakes, and the flavor and cream flakes are incorporated, while in suspension and floating to the inclined bottom portions 15, 15 of the refrigerating chamber.

The flakes of congealed moisture fall upon the inclined bottom walls 15 of the air chamber, and are then guided to the transversely extending screw conveyor 24, which is operated in the central trough 25 through its shaft 26 and pulley 27, as by a belt, from a motor not shown.

The end 28 of the trough projects outside the inclosure 22, and the screw conveyor may deliver the congealed cream or flakes into a waiting receptacle. But preferably a packing can or carton 29 is utilized to receive the material from the screw, which can as shown is slipped over the open end of the trough and held in position by the spring pressed retaining bar 30. The bar is horizontally disposed in the opening 30' of a post 31 and is provided with a head 32 bearing against the receptacle 29, a spring 33 being interposed between the head and post compression therebetween. Thus as the screw conveyer passes the material through the open end 28 into the receptacle 29, the resiliently supported or spring pressed head 32 offers the required resistance to insure proper packing of the material in the receptacle. The resistance of the head 32 may of course be varied, to vary the density with which the material is packed within the receptacle, by changing the spring 33 or varying the compression of the spring. And as the material is forced through the conveyer into the receptacle, the latter is backed off the projecting end 28 of the trough by pressure of the material from the screw, until the receptacle is filled to the required limit. A filled receptacle may quickly be withdrawn and an empty receptacle applied in its place, or the material may be permitted to fall into a waiting receptacle standing beneath the spout or delivery end 28 of the trough. The receptacles as indicated at 29 may be of different shapes, sizes and capacities, and the frozen material molded therein ready for distribution and use. Fruits, berries, &c, may be introduced into the material before molding, as for instance if cherry custard is being prepared, the liquid custard is first atomized and congealed, and as the confection exudes from the spout 28 it may be caught in molds to which the cherries are being introduced for the purpose of incorporating the cherries as a part of the molded or packed confection.

From the above description taken in connection with my drawings, it will be apparent that the ice cream, ice, custard, or other delicacy prepared as a confection in this manner will be of smooth and uniform texture, without lumps or small pieces of ice frequently found in the commercial ice cream, and the flaky consistency of the confection may be varied as desired, i. e. the frozen material may be compacted or packed to a dense formation or may remain light in structure or texture.

Having thus fully described my invention, what I claim as new and desire to secure by Letters Patent is:—

1. The combination with an enclosure and means therein for maintaining the atmosphere at a temperature below the freezing point, of liquid atomizers in said enclosure, means for receiving the congealed atoms from said atomizers, and spaced interior walls within the enclosure with their lower ends terminating above the bottom of the enclosure to form venting spaces.

2. The combination with an enclosure forming a refrigerating chamber, of refrigerating coils in said chamber, means for atomizing a liquid in said chamber, means for receiving the congealed atoms, and a spaced interior wall within the refrigerating chamber having its lower end terminating above the bottom of the chamber thereby forming a venting space having an upper vent-outlet.

3. The combination with an enclosure forming a refrigerating chamber, of liquid-atomizing means including a nozzle in said chamber, refrigerating coils within said chamber adjacent to said liquid atomizing means, and means for locally heating said liquid atomizing means for the purpose described.

4. The combination with an enclosure forming a refrigerating chamber, of liquid atomizing nozzles in said chamber, refrigerating coils adjacent to said nozzles, and means for preventing freezing of liquid within said nozzles.

5. The combination with an enclosure forming a refrigerating chamber, of liquid atomizing nozzles in said chamber, refrigerating coils adjacent to said nozzles, and electric heating-elements associated with said nozzles for preventing freezing of liquid within said nozzles.

6. The combination with an enclosure having a bottom formed with converging walls and a conveyor therein, spaced side walls having their lower ends terminating above said bottom and forming vent spaces, liquid atomizing nozzles located in the upper portion of said chamber, and means for preventing freezing of liquid within said nozzles, of refrigerating coils located adjacent to said nozzles for the purpose described.

In testimony whereof I affix my signature.

RUSSELL A. WILLSON.